(12) United States Patent
Nguyen (10) Patent No.: US 10,148,108 B2
(45) Date of Patent: Dec. 4, 2018

(54) BATTERY CHARGER WITH USB TYPE-C ADAPTER

(71) Applicant: Intel Corporation, Santa Clara, CA (US)

(72) Inventor: Don J. Nguyen, Portland, OR (US)

(73) Assignee: Intel Corporation, Santa Clara, CA (US)

(*) Notice: Subject to any disclaimer, the term of this patent is extended or adjusted under 35 U.S.C. 154(b) by 230 days.

(21) Appl. No.: 14/926,832

(22) Filed: Oct. 29, 2015

(65) Prior Publication Data

US 2017/0126039 A1    May 4, 2017

(51) Int. Cl.
*H02J 7/00* (2006.01)

(52) U.S. Cl.
CPC ............ *H02J 7/0052* (2013.01); *H02J 7/007* (2013.01); *H02J 7/0077* (2013.01); *H02J 2007/0062* (2013.01); *H02J 2007/0096* (2013.01)

(58) Field of Classification Search
USPC .................................................. 320/107, 162
See application file for complete search history.

(56) References Cited

U.S. PATENT DOCUMENTS

| 7,853,818 B2 | 12/2010 | Nguyen | |
| 9,400,546 B1* | 7/2016 | Agarwal | G06F 1/3287 |
| 9,748,782 B1* | 8/2017 | Sheng | G06F 1/266 |
| 2008/0054855 A1* | 3/2008 | Hussain | H02J 7/0057 |
| | | | 320/162 |
| 2008/0315842 A1 | 12/2008 | Li | |
| 2010/0015375 A1 | 1/2010 | Beyer | |
| 2013/0200841 A1* | 8/2013 | Farkas | H02J 7/0042 |
| | | | 320/107 |
| 2014/0117922 A1 | 5/2014 | Pham | |
| 2014/0122909 A1 | 5/2014 | Hawawini et al. | |
| 2014/0136863 A1 | 5/2014 | Fritchman et al. | |
| 2015/0035477 A1 | 2/2015 | Wong et al. | |
| 2015/0236522 A1* | 8/2015 | Zhao | H02J 7/007 |
| | | | 320/162 |
| 2015/0270733 A1 | 9/2015 | Inha et al. | |
| 2015/0301552 A1* | 10/2015 | Lim | H02J 7/0052 |
| | | | 327/538 |

(Continued)

OTHER PUBLICATIONS

International Searching Authority, "Notification of Transmittal of the International Search Report and the Written Opinion of the International Searching Authority," dated Jan. 5, 2017 in International application No. PCT/US2016/053077.

*Primary Examiner* — Brian Ngo
(74) *Attorney, Agent, or Firm* — Trop, Pruner & Hu, P.C.

(57) ABSTRACT

In an embodiment, a system includes a first link to couple first universal serial bus (USB) type-C control logic and electrical charger control logic of electrical charger circuitry. The first link is to provide a first data path between the first USB type-C control logic and the electrical charger control logic. The system also includes the first USB type-C control logic to receive first control data from the electrical charger control logic via the first link, and a second link to couple the first USB type-C control logic to second USB type-C control logic of a USB type-C power adapter circuitry. The second link is to provide a second data path for the first control data from the first USB type-C controller logic to the second USB type-C control logic. Other embodiments are described and claimed.

17 Claims, 4 Drawing Sheets

(56) References Cited

U.S. PATENT DOCUMENTS

| | | | |
|---|---|---|---|
| 2015/0346790 A1* | 12/2015 | Talmola | G06F 1/266 710/104 |
| 2016/0049803 A1* | 2/2016 | Hsu | H02J 7/045 320/162 |
| 2016/0179648 A1* | 6/2016 | Srivastava | G06F 11/3051 710/16 |
| 2016/0261128 A1* | 9/2016 | Johnston | H02J 7/0036 |
| 2016/0364360 A1* | 12/2016 | Lim | G06F 13/385 |
| 2016/0378154 A1* | 12/2016 | Srivastava | G06F 1/266 713/300 |
| 2017/0005494 A1* | 1/2017 | Li | H02J 7/0044 |
| 2017/0085098 A1* | 3/2017 | Sporck | H02J 7/007 |
| 2017/0222463 A1* | 8/2017 | Pullen | G06F 9/44505 |

* cited by examiner

BATTERY CHARGER WITH USB TYPE-C ADAPTER

TECHNICAL FIELD

Embodiments pertain to a universal serial bus (USB) type-C power adapter.

BACKGROUND

Conventional battery chargers, e.g., battery chargers used in laptop computers and cell phones, can result in 10-15% of dissipated power, e.g., for a 30 W system, 3-4.5 W can be dissipated in the battery charger, which may cause a significant thermal problem for system design, and may limit system performance. Currently the battery charger may also occupy a significant printed circuit board area, e.g., 300-400 mm² for a 30 W system.

A battery charger, including its associated components, e.g., field effect transistors (FETs) and one or more inductors, may be designed to support a maximum power capability (e.g., capacity) of an AC/DC adapter shipped with the system (e.g., 30 W in this example). If a higher-power AC/DC adapter is used, (e.g., 100 W), the battery charger may not be able to take advantage of this higher-power capability.

DETAILED DESCRIPTION

Improvements in power efficiency of some battery charger systems may result in reduction of power lost due to heat dissipation. Hence, a battery charger system with efficiency improvements can take advantage of an improved/reduced thermal constraint to receive power at a higher rate than with a conventional battery charger system.

In embodiments, a higher-power adapter may be advantageously utilized without increasing sizes of components in the battery charger system, and without an increase in power dissipation of the battery charger system. In embodiments, a USB type-C adapter can communicate with the battery charger system to indicate its power capability (e.g., maximum output power capacity) via a USB controller. The battery charger system (e.g., an Intel® adaptive mobile power system (iAMPS) battery charger) can adjust its input power limit (e.g., via an input current monitor block) to increase power received. A battery charger controller can monitor the input power and can command the USB type-C power adapter to change the output voltage of the USB type-C power adapter to control the battery charging current.

Figure 1:
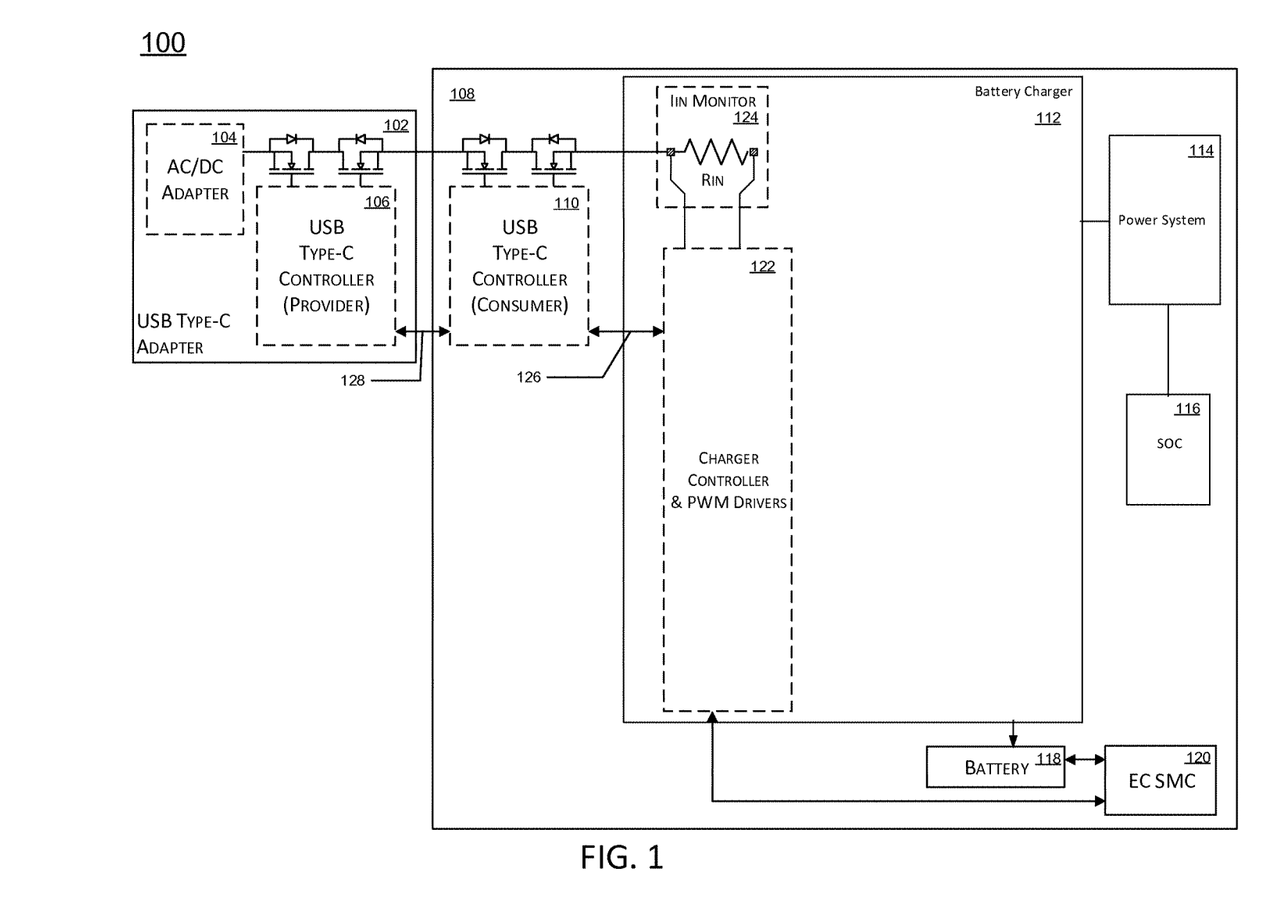
FIG. 1 is a block diagram of a system, according to an embodiment of the present invention.

FIG. 1 is a block diagram of a system, according to embodiments of the present invention. The system 100 includes a USB type-C power adapter 102 coupled to a system 108. For example, the system 108 may be a computer system such as a laptop computer, cell phone, or other device typically powered by a portable energy source such as a battery.

The USB type-C power adapter 102 includes an AC/DC adapter 104 to provide DC power, and a USB type-C controller 106 (also provider controller 106 herein). The system 108 includes a USB type-C controller 110 (also consumer controller 110 herein), a battery charger 112, a power system 114, a system-on-a-chip (SOC) 116, a battery 118, an embedded controller system management controller (EC SMC) 120, a physical link 126 that couples a charger controller 122 of the battery charger 112 with the consumer controller 110, and a data pin 128 to couple the provider controller 106 with the consumer controller 110. In some embodiments, more than one pin of a USB type-C connector is reserved for data transfer between the system 108 and the USB type-C adapter 102.

In operation, upon initial coupling of the USB type-C power adapter 102 to the system 108, the provider controller 106 sends information about the USB type-C power adapter 102 to the consumer controller 110, which provides the information to the charger controller 112 via the physical link 126. The information may be sent in a digital form (e.g., binary data) and may include an indication that the USB type-C power adapter 102 is an externally programmable adapter and may specify, e.g., a power capability of the USB type-C power adapter 102 (e.g., maximum deliverable power and output voltage range), an instantaneous operating temperature of the USB type-C power adapter 102, and an upper operating temperature limit. In embodiments, the current operating temperature information may be provided to the consumer controller 110 on an ongoing basis, e.g., periodically or continuously.

The charger controller 122 generates and sends information, e.g., digital information such as binary data according to a digital protocol, to the consumer controller 110 via the physical link 126. The digital information may include pulse width modulation (PWM) information at which the battery charger 112 will operate, a preferred voltage range of voltage to be received from the USB type-C power adapter 102, a resolution of the voltage output of the USB type-C power adapter 102 (e.g., voltage increment size), an indication of whether the battery 118 is nearly completely charged, and other information. The digital information may be conveyed from the consumer controller 110 to the provider controller 102 via the pin 128.

The charger controller 122 may adjust charging parameters in the battery charger 112 based on the digital information received from the USB type-C power adapter 102. The charger controller 122 may send commands to the USB type-C power adapter 102 via physical link 126, consumer controller 110, and pin 128 during charging of the battery 118 to adjust output voltage $V_{out}$ of the USB type-C power adapter 102. For example, the charger controller 122 may send a command for an incremental increase in $V_{out}$ in order to increase a charging current $I_{batt}$, and the charger controller 122 may monitor $I_{batt}$ to protect against $I_{batt}$ exceeding a maximum charging current. The charger controller 122 may send commands repeatedly to increment $V_{out}$ until the maximum charging current is reached. The charger controller 122 may monitor the operating temperature of the USB type-C power adapter 102, and may command a reduction in $V_{out}$ responsive to an indication that the operating temperature of the USB type-C power adapter 102 exceeds a maximum safe operating temperature. The charger controller 122 may send an indication that charging is nearly complete, which may cause the USB type-C power adapter 102 to reduce $V_{out}$. The charger controller 122 may cease charging of the battery 118 upon detection of a battery voltage $V_{batt}$ that indicates a fully charged battery, and the charger controller 122 may issue a command to cease charging the battery 118, e.g., by shutting off an FET that gates charging current to the battery 118.

Figure 2:
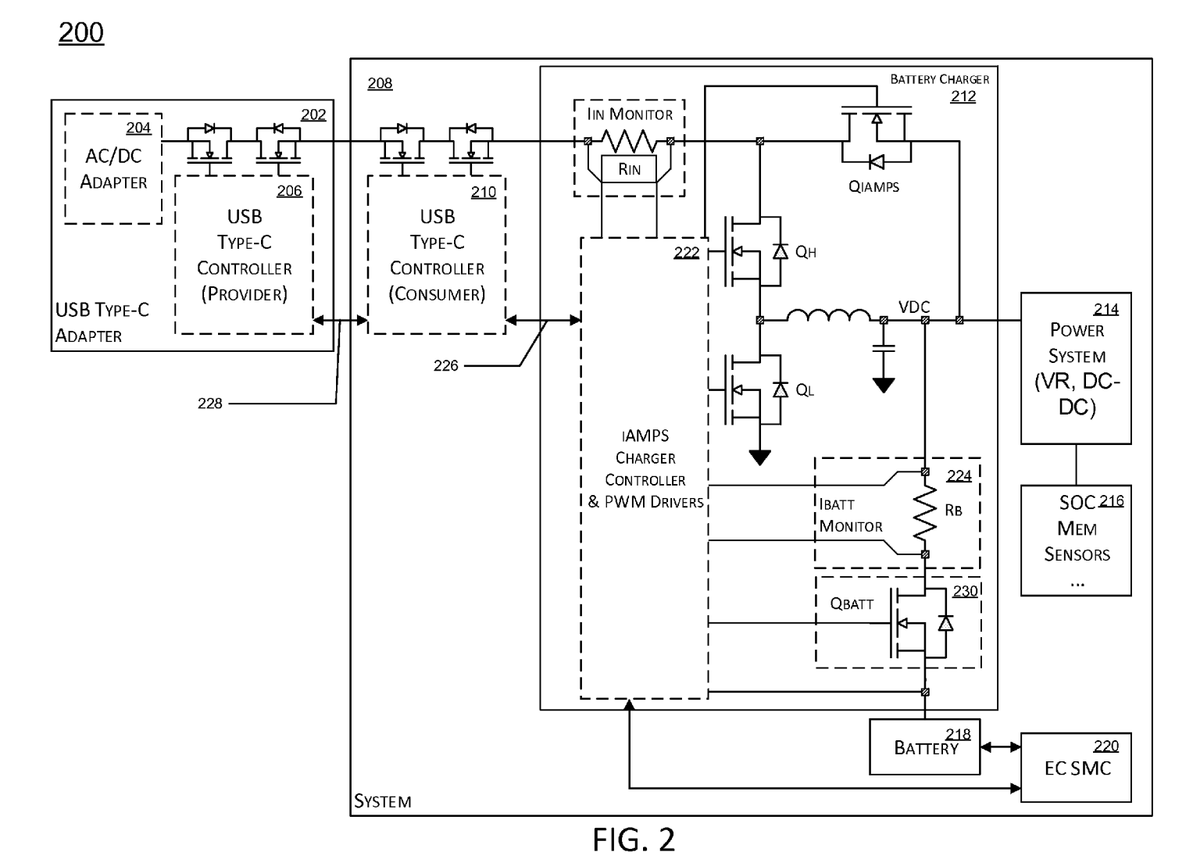
FIG. 2 is a block diagram of a system, according to an embodiment of the present invention.

FIG. 2 is a block diagram of a system, according to an embodiment of the present invention. System 200 includes a USB type-C power adapter 202 coupled to a system 208. For example, the system 208 may be a computer system such as a laptop computer, cell phone, or other device that may be powered by a portable energy source such as a battery, e.g., battery 218 or by an AC/DC power adapter. USB type-C adapter 202 may include an AC/DC adapter 204 and a USB type-C controller 206 (also provider controller 206 herein).

System 208 includes a battery charger 212 (e.g., Intel® adaptive mobile power system (iAMPS)). The battery charger 212 includes charger controller 222, which may include one or more pulse width modulator (PWM) drivers. The charger controller 222 is coupled by a link 226 (e.g., a physical link) to a USB type-C controller 210 (also consumer controller 210 herein). Information (e.g., in a digital form, such as binary data) may be conveyed from the charger controller 222 to the consumer controller 210 via the link 226, and from the consumer controller 210 via a pin 228 (e.g., a USB type-C connector pin) to the provider controller 206. Additionally, digital information may be conveyed from the provider controller 206 via the pin 228 to the consumer controller 210, and from the consumer controller 210 via the link 226 to the charger controller 222. The digital information conveyed may include an indication that the USB type-C adapter has capability for its output voltage to be externally programmed, power capability of the USB type-C adapter 202 (e.g., maximum deliverable power and output voltage range), temperature of the USB type-C adapter 202, maximum operating temperature, etc. The charger controller 222 may adjust charging parameters in the battery charger 212 based on the digital information received from the USB type-C adapter 202.

The information received from the charger controller 222 may be conveyed by pin 228 (e.g., a physical pin of a USB type-C connector) from the consumer controller 210 to the provider controller 206. The information conveyed to the provider controller 206 of the USB type-C adapter 202 may include pulse width modulation (PWM) information, preferred voltage range for the adapter, resolution of the output of the USB type-C power adapter 204, request to increment an output voltage $V_{out}$, an indication of whether charging of the battery 218 is nearly complete, and other information. The provider controller 206 may adjust an output of the USB type-C adapter 202 responsive to the input information received.

In operation, the charger controller 222 may issue a command to the consumer controller 210 for the USB type-C adapter 202 to provide voltage $V_{out}$ to the battery charger 212. The battery charger 212 may charge battery 218 using power received from the USB type-C adapter 202. The consumer controller 222 may monitor temperature information received from the USB type-C adapter 202, sent from the provider controller 206 via the (dedicated data) pin 228 to the consumer controller 210, and via the physical link 226 to the consumer controller 222. If the temperature information (e.g., digital data) received indicates that a temperature of the USB type-C adapter 202 exceeds a thermal limit, the charger controller 222 may issue a command to the provider controller 206 to reduce $V_{out}$, which can result in a smaller output power that may result in a reduction in the temperature of the USB type-C adapter 202.

The charger controller 222 may issue a command to increment $V_{out}$. The command may be sent from the charger controller 222 via the link 226 to the consumer controller 210, and via the pin 228 to the provider controller 228. Upon receipt by the provider controller 206, the command produces an incremental increase in $V_{out}$, which results in an increase in current $I_{batt}$ to be provided to the battery 218.

The charger controller 222 may monitor $I_{batt}$ via $I_{batt}$ monitor 224. Provided $I_{batt}$ is less than a maximum permissible battery charging current ($I_{batt\_charge}$) the charger controller can issue successive commands to increment $V_{out}$ so as to increase $I_{batt}$ until $I_{batt\_charge}$ is attained. Incremental increases in $V_{out}$ result in incremental increases in $I_{batt}$. Increasing $I_{batt}$ results in faster charging of the battery 218. For example, $V_{out}$ may be incremented by 0.01 volts, or by another incremental voltage. Small increments in voltage typically result in small increments in $I_{batt}$, and hence tight control over $I_{batt}$ and charging rate may be maintained.

The charger controller 222 may monitor a battery voltage $V_{batt}$ and as the battery 218 nears completion of charging, the charger controller 222 may indicate to the provider controller 206 that charging of the battery 218 is close to completion. When the battery 218 is fully charged, the charger controller 222 may send a command to shut off FET 230 in order to stop the battery 218 from continuing to charge.

Figure 3:
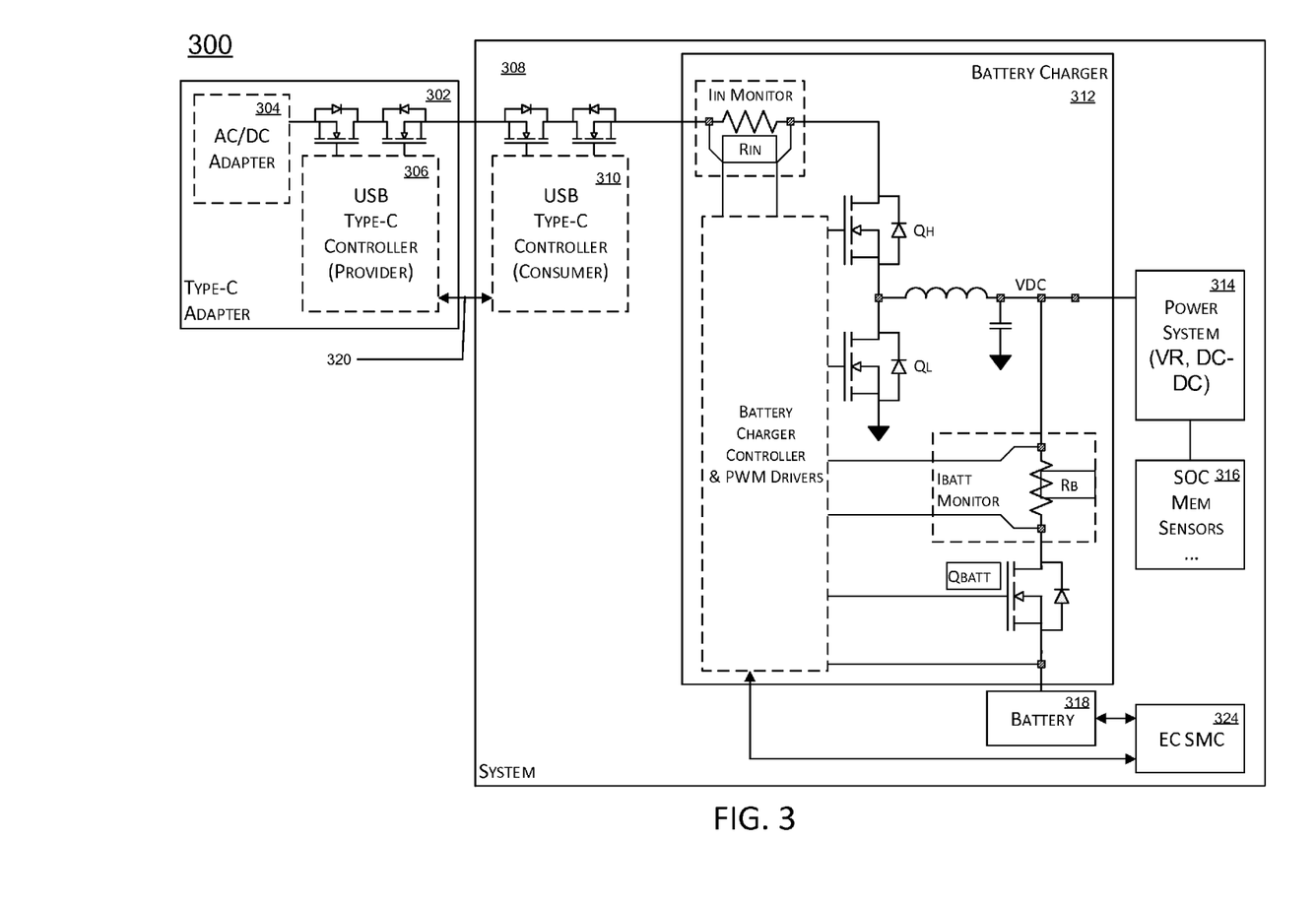
FIG. 3 is a block diagram of a system, according to an embodiment of the present invention.

FIG. 3 is a block diagram of a system, according to an embodiment of the present invention. System 300 includes a USB type-C AC/DC adapter 302 coupled to a system 308. For example, the system 308 may be a computer system such as a laptop computer, cell phone, or other device typically powered by a portable energy source such as a battery, e.g., battery 318. The system 308 includes a battery charger 312, a USB type-C (consumer) controller 310, battery 318, power system 314, system on a chip (SOC) along with memory and sensors 316, an embedded controller system management controller (EC SMC) 324, and may include other components/systems (not shown). The USB type-C AC/DC adapter 302 includes an AC/DC adapter and a USB type-C controller 306 (also provider controller 306 herein).

In operation, upon coupling of the system 308 to the USB type-C adapter 302, provider controller 306 may output adapter data in a digital format (e.g., binary data) that may include an indication that the USB type-C AC/DC adapter 302 is externally programmable, a power delivery capability, an output voltage range, an indication of instantaneous temperature of the USB type-C AC/DC adapter 302, a maximum permissible temperature of the USB type-C AC/DC adapter 302, and may include other information. The adapter data may be sent from the provider controller 306 to the consumer controller 310 via a dedicated digital data pin 320.

The consumer controller 310 may provide system digital data (e.g., binary data), via the digital data pin 320 to a USB type-C controller 306 (provider controller 306) of the USB type-C adapter 302. The digital data may include voltage to be provided by the adapter 302 and other information. Responsive to receipt of the system digital data the provider controller 306 may set an output voltage $V_{out}$ to be provided to the system 308.

Figure 4:
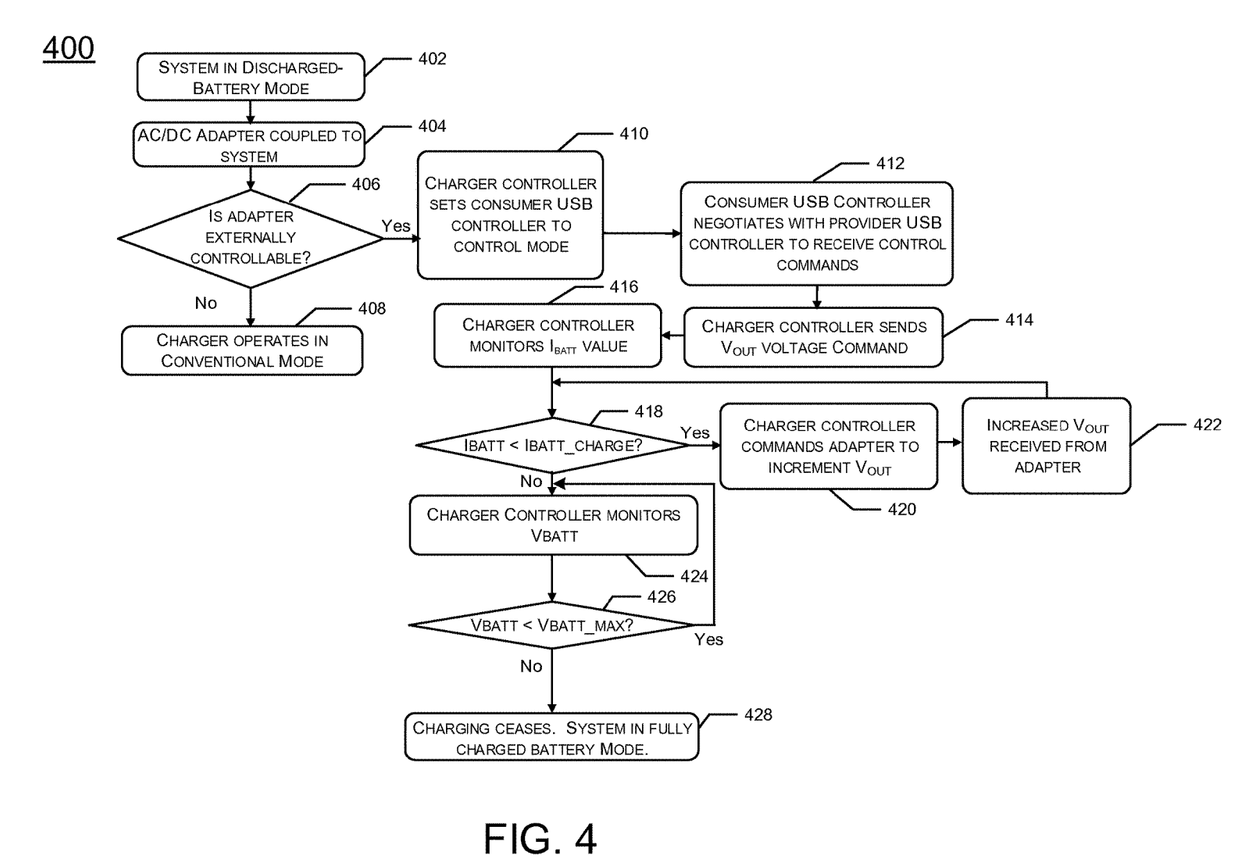
FIG. 4 is a flow diagram of a method, according to an embodiment of the present invention.

FIG. 4 is a flow diagram of a method, according to embodiments of the present invention. Method 400 begins at block 402, where a system is in a discharged battery mode, e.g., a battery of the system (e.g., a portable computer system such as a laptop computer or other battery-powered system) is at least partially discharged. Continuing to block 404, an AC/DC power adapter is coupled to the system. Advancing to decision diamond 406, if the AC/DC power adapter is an externally controllable adapter that includes a data pin to receive a control signal (e.g., digital data) to control output voltage of the adapter (e.g., iAMPS adapter) the method proceeds to block 410. If the adapter is not an externally controllable adapter, moving to block 408 the charger is to operate in a conventional mode, e.g., without providing control information from the system to the adapter or receiving, by the system, status information of the adapter.

If, at decision diamond 406, the power adapter is an externally controllable adaptor, proceeding to block 410 a charger controller within the battery charger commands a USB type-C controller within the system (via a physical link that couples the charger controller to the USB type-C controller) to be configured as a consumer type-C controller that is to send and receive information to/from the power adapter via a dedicated pin of a USB type-C connector that couples the power adapter to the system.

Continuing to block 412, the consumer controller negotiates with a provider USB type-C controller within the power adapter to agree on a mode of communication. Advancing to block 414, the charger controller initiates a $V_{out}$ voltage command to be sent via the consumer type-C controller to the provider type-C controller, causing an output voltage $V_{out}$ to be output by the power adapter to the charging system.

Moving to block 416, the battery charger controller monitors a charging current $I_{batt}$ (e.g., via a battery monitor). Advancing to decision diamond 418, if the charging current $I_{batt}$ is less than a highest permissible charging value $I_{batt\_charge}$, proceeding to block 420 the battery charger controller initiates a command to increment $V_{out}$, to be conveyed to the provider USB type-C controller from the consumer USB type-C controller, which is to receive the command via the physical link that links the charger controller and the consumer USB type-C controller.

Continuing to block 422, responsive to the command to increment $V_{out}$, the battery charger is to receive an incremented $V_{out}$ supplied by the adapter. Returning to decision diamond 418, if the charging current $I_{batt}$ is less than a maximum recommended charging current $I_{batt\_charge}$, the method proceeds to block 420 to increment $V_{out}$ that is to result in an increased charging current $I_{batt}$. If at decision diamond 418, $I_{batt}$ is equal to (or marginally greater than) $I_{batt\_charge}$, continuing to block 424 the charger controller monitors a value of the battery voltage $V_{batt}$. Advancing to decision diamond 426, if $V_{batt}$ is less than a highest value of battery voltage $V_{batt\_max}$ corresponding to a fully charged battery, the method returns to block 424, and the charger controller monitors the value of $V_{batt}$ while the battery (or other energy storage device being charged) continues to charge. If, at decision diamond 426 $V_{batt}$ is equal to $V_{batt\_max}$, proceeding to block 428 charging of the battery ceases, as the system is in fully charged battery mode.

Thus, according to embodiments presented herein, a charging controller of an energy storage device charger (e.g., battery charger) can control output of a USB type-C power adapter by sending, via a dedicated physical link, command signals (e.g., digital data) to a USB type-C consumer controller that sends the command signals to a USB type-C provider controller of the USB type-C power adapter, e.g., via one or more data pins in a USB type-C connector that couples the USB type-C adapter and the system. Additionally, the provider controller can send adapter information (e.g., power capability, power adapter temperature, etc.) to the charger controller via the consumer controller, and the adapter information can be used to adjust output voltage, etc. so as to maintain safe operating conditions for the adapter and the energy storage device being charged.

Additional embodiments are described below.

A first embodiment is a system including: a first link to couple first universal serial bus (USB) type-C control logic and electrical charger control logic of electrical charger circuitry, the first link to provide a first data path between the first USB type-C control logic and the electrical charger control logic; the first USB type-C control logic to receive first data from the electrical charger control logic via the first link; and a second link to couple the first USB type-C control logic to second USB type-C control logic of a USB type-C power adapter circuitry, the second link to provide a second data path for the first data from the first USB type-C controller logic to the second USB type-C control logic.

A $2^{nd}$ embodiment includes elements of the first embodiment, where the first link includes a physical link between the first universal serial bus (USB) type-C control logic and the electrical charger control logic.

A $3^{rd}$ embodiment includes elements of the first embodiment, where the control data includes an indication of a first output voltage requested to be received from the USB type-C power adapter circuitry by the electrical charger circuitry.

A $4^{th}$ embodiment includes elements of the $3^{rd}$ embodiment, where the first USB type-C control logic is to receive via the first link a plurality of commands issued in succession by the electrical charger control logic, each command including a request to increment the output voltage, and where the first USB type-C control logic is to send each of the commands to the second USB type-C control logic via the second link and the system is to, responsive to each command sent to the second USB type-C control logic, receive a corresponding incremented output voltage that is incremented from a voltage previously received from the USB type-C power adapter circuitry.

A $5^{th}$ embodiment includes elements of the first embodiment, where the second link is to carry second data from the second USB type-C control logic to the first type-C control logic.

A $6^{th}$ embodiment includes elements of the $5^{th}$ embodiment, where the second data includes temperature data associated with the USB type-C power circuitry.

A $7^{th}$ embodiment includes elements of the $5^{th}$ embodiment, the second data includes an indication of an output power capacity of the USB type-C power circuitry.

An $8^{th}$ embodiment includes elements of any one of embodiments 1 to 7, where the first data includes digital data.

A $9^{th}$ embodiment is a method including: providing control data from charger control logic of a battery charger within a system to universal serial bus (USB) type-C control logic of the system via a physical link, where the control data specifies a voltage; providing the control data from the USB type-C control logic to a USB type-C power adapter via a data pin that couples the USB type-C control logic and the USB type-C power adapter; and responsive to providing the control data to the USB type-C power adapter receiving, by the system, the voltage from the USB type-C power adapter.

A $10^{th}$ embodiment includes elements of the $9^{th}$ embodiment, further including for each of a plurality of iterations monitoring a battery charging current $I_{batt}$, providing corresponding updated control data from the charger control logic to the USB type-C control logic via the physical link and from the USB type-C control logic to the USB type-C power adapter via the data pin, where each corresponding updated control data specifies a corresponding incremented voltage responsive to $I_{batt}$<a threshold current ($I_{batt\_threshold}$), and receiving from the USB type-C power adapter the corresponding incremented voltage responsive to providing the corresponding updated control data to the USB type-C power adapter.

An 11$^{th}$ embodiment includes elements of the 10$^{th}$ embodiment, further including monitoring by the charger control logic, a battery voltage ($V_{batt}$) of a battery being charged by the battery charger, and responsive to an indication that $V_{batt}$ exceeds a battery voltage threshold, ceasing to charge the battery.

A 12$^{th}$ embodiment includes elements of the 9$^{th}$ embodiment, further including providing data associated with a pulse width duty cycle of the battery charging logic to the USB type-C power adapter via the data pin.

A 13$^{th}$ embodiment includes elements of the 9$^{th}$ embodiment, further including receiving from the USB type-C power adapter by the first universal serial bus (USB) type-C control logic via the data pin, USB type-C power adapter data that includes an indication of a power output capability of the USB type-C power adapter.

A 14$^{th}$ embodiment includes elements of the 13$^{th}$ embodiment, where the USB type-C power adapter data further includes an indication of a temperature of the USB type-C power adapter.

A 15$^{th}$ embodiment includes elements of any one of embodiments 9 to 14, where the control data includes digital data.

A 16$^{th}$ embodiment is a machine readable medium having stored thereon instructions, which if performed by a machine cause the machine to perform a method including: receiving, at provider USB type-C control logic of a USB type-C power adapter, control data from consumer USB type-C control logic of a system via a dedicated data pin, where the control data is in a digital format and where the control data includes an indication of a specified output voltage value; and outputting from the USB type-C power adapter to the system a voltage having the specified voltage value responsive to receipt by the provider USB type-C control logic of the control data.

A 17$^{th}$ embodiment includes elements of the 16$^{th}$ embodiment, where the control data received by the provider USB type-C control logic from the consumer USB type-C control logic has been received by the consumer USB type-C control logic via a physical link from charger control logic of a battery charger of the system.

An 18$^{th}$ embodiment includes elements of the 16$^{th}$ embodiment, where the method further includes providing, by the provider USB type-C control logic to the consumer USB type-C control logic via the dedicated data pin, power adapter information including a power output capability associated with the USB type-C power adapter.

A 19$^{th}$ embodiment includes elements of the 18$^{th}$ embodiment, where the power adapter information further includes a temperature parameter associated with a temperature of the USB type-C power adapter.

A 20$^{th}$ embodiment includes elements of the 16$^{th}$ embodiment, where the method further includes receiving at the provider USB type-C control logic updated control data including a command to increment the voltage, the updated control data received from the consumer USB type-C control logic of a system via the dedicated data pin, and responsive to receipt of the updated control data outputting an incremented voltage that is incremented above the specified output voltage value.

A 21$^{st}$ embodiment is a method including: receiving, at provider USB type-C control logic of a USB type-C power adapter, control data from consumer USB type-C control logic of a system via a dedicated data pin, where the control data is in a digital format and where the control data includes an indication of a specified output voltage value; and outputting from the USB type-C power adapter to the system a voltage having the specified voltage value responsive to receipt by the provider USB type-C control logic of the control data.

A 22$^{nd}$ embodiment includes elements of the 21$^{st}$ embodiment, where the control data received by the provider USB type-C control logic from the consumer USB type-C control logic has been received by the consumer USB type-C control logic via a physical link from charger control logic of a battery charger of the system.

A 23$^{rd}$ embodiment includes elements of the 21$^{st}$ embodiment, where the method further includes providing, by the provider USB type-C control logic to the consumer USB type-C control logic via the dedicated data pin, power adapter information including a power output capability associated with the USB type-C power adapter.

A 24 embodiment includes elements of the 23$^{rd}$ embodiment, where the power adapter information further includes a temperature parameter associated with a temperature of the USB type-C power adapter.

A 25$^{th}$ embodiment includes elements of the 21$^{st}$ embodiment, where the method further includes receiving at the provider USB type-C control logic updated control data including a command to increment the voltage, the updated control data received from the consumer USB type-C control logic of a system via the dedicated data pin, and responsive to receipt of the updated control data outputting an incremented voltage that is incremented above the specified output voltage value.

A 26$^{th}$ embodiment is an apparatus including means for performing the method of any one of embodiments 21 to 25.

A 27$^{th}$ embodiment is a system including: provider universal serial bus (USB) type-C control logic of a USB type-C power adapter to receive control data in a digital format via a data pin from consumer USB type-C control logic of a consumer system that includes charger control logic, where the control data is to specify an output voltage of the USB type-C power adapter; and power circuitry of the USB type-C power adapter to provide the output voltage to the consumer system responsive to receipt by the provider USB type-C control logic of the control data.

A 28$^{th}$ embodiment includes elements of the 27$^{th}$ embodiment, where the provider universal serial bus (USB) type-C control logic is to send power adapter data to the consumer USB type-C control logic via the data pin, where the power adapter data includes a power output capability of the USB type-C power adapter.

A 29$^{th}$ embodiment includes elements of the 28$^{th}$ embodiment, where the power adapter data includes temperature information associated with the USB type-C power adapter.

A 30$^{th}$ embodiment includes elements of any one of embodiments 27 to 29, where the control data is to be provided to the consumer USB type-C control logic by the charger control logic via a physical link that couples the consumer USB type-C control logic and the charger control logic.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system comprising:
a first link to couple first universal serial bus (USB) type-C control logic and electrical charger control logic of electrical charger circuitry, the first link to provide a first data path between the first USB type-C control logic and the electrical charger control logic, wherein the first link comprises a physical link of a portable computing device coupled between the first USB type-C control logic and the electrical charger control logic, wherein the first USB type-C control logic and the electrical charger control logic are integrated in the portable computing device;
the first USB type-C control logic to receive first control data from the electrical charger control logic via the first link; and
a second link to couple the first USB type-C control logic to second USB type-C control logic of a USB type-C power adapter circuitry, the second link to provide a second data path for the first USB type-C control logic to send the first control data received from the electrical charger control logic to the second USB type-C control logic.

2. The system of claim 1, wherein the first control data comprises digital data.

3. The system of claim 1, wherein the first control data includes a first indication of an output voltage requested to be received from the USB type-C power adapter circuitry by the electrical charger circuitry.

4. The system of claim 3, wherein the first USB type-C control logic is to receive via the first link a plurality of commands issued in succession by the electrical charger control logic, each command including a request to increment the output voltage, and wherein the first USB type-C control logic is to send each of the plurality of commands to the second USB type-C control logic via the second link and the system is to, responsive to each command sent to the second USB type-C control logic, receive a corresponding incremented output voltage that is incremented from a voltage previously received from the USB type-C power adapter circuitry.

5. The system of claim 1, wherein the second link is to carry second data from the second USB type-C control logic to the first type-C control logic.

6. The system of claim 5, wherein the second data includes temperature data associated with the USB type-C power adapter circuitry.

7. The system of claim 5, wherein the second data includes an indication of an output power capacity of the USB type-C power adapter circuitry.

8. A non-transitory machine readable medium having stored thereon instructions, which if performed by a machine cause the machine to perform a method comprising:
providing control data from charger control logic of a battery charger within a portable computing system to universal serial bus (USB) type-C control logic within the portable computing system via a physical link within the portable computing system, wherein the control data specifies a voltage;
providing the control data from the USB type-C control logic to a USB type-C power adapter via a data pin that couples the USB type-C control logic and the USB type-C power adapter; and
responsive to providing the control data to the USB type-C power adapter receiving, by the portable computing system, the voltage from the USB type-C power adapter.

9. The non-transitory machine readable medium of claim 8, wherein the method further comprises for each of a plurality of iterations monitoring a battery charging current, providing corresponding updated control data from the charger control logic to the USB type-C control logic via the physical link and from the USB type-C control logic to the USB type-C power adapter via the data pin, wherein each corresponding updated control data specifies a corresponding incremented voltage responsive to the battery charging current being less than a threshold current, and receiving from the USB type-C power adapter the corresponding incremented voltage responsive to providing the corresponding updated control data to the USB type-C power adapter.

10. The non-transitory machine readable medium of claim 9, wherein the method further comprises monitoring by the charger control logic, a battery voltage of a battery being charged by the battery charger, and responsive to an indication that the battery voltage exceeds a battery voltage threshold, ceasing to charge the battery.

11. The non-transitory machine readable medium of claim 8, wherein the control data comprises digital data.

12. The non-transitory machine readable medium of claim 8, wherein the method further comprises receiving from the USB type-C power adapter by the USB type-C control logic via the data pin, USB type-C power adapter data that includes an indication of a power output capability of the USB type-C power adapter.

13. The non-transitory machine readable medium of claim 12, wherein the USB type-C power adapter data further includes an indication of a temperature of the USB type-C power adapter.

14. The non-transitory machine readable medium of claim 8, wherein the method further comprises providing data associated with a pulse width duty cycle of the charger control logic to the USB type-C power adapter via the data pin.

15. A portable computing device comprising:
a system on chip (SoC) to execute instructions;
an embedded controller coupled to the SoC;
a power system to provide power to the portable computing device;
a battery charger to charge a battery of the portable computing device, wherein the battery charger comprises:
a charger controller to control charging of the battery;
a current monitor to monitor a charging current; and
a physical link to couple the battery charger to a universal serial bus (USB) type-C consumer controller;
the USB type-C consumer controller coupled to the battery charger via the physical link; and
a data pin via which control data is to be communicated;
wherein when the portable computing device is coupled to a power adapter, the USB type-C consumer controller is to perform a negotiation with a USB type-C provider controller of the power adapter, and thereafter receive a voltage command from the charger controller via the physical link, and send the voltage command to the USB type-C provider controller via the data pin to cause the power adapter to output a voltage to the battery charger.

16. The portable computing device of claim 15, wherein the physical link comprises a dedicated physical link.

17. The portable computing device of claim 15, wherein the USB type-C consumer controller is to send information to the USB type-C provider controller, and in response to the information, the power adapter is to adjust the voltage.

* * * * *